US008984331B2

(12) United States Patent
Quinn

(10) Patent No.: US 8,984,331 B2
(45) Date of Patent: Mar. 17, 2015

(54) SYSTEMS AND METHODS FOR AUTOMATED MEMORY AND THREAD EXECUTION ANOMALY DETECTION IN A COMPUTER NETWORK

(75) Inventor: Mitchell N. Quinn, Raleigh, NC (US)

(73) Assignee: Triumfant, Inc., Research Triangle Park, NC (US)

( * ) Notice: Subject to any disclaimer, the term of this patent is extended or adjusted under 35 U.S.C. 154(b) by 225 days.

(21) Appl. No.: 13/605,445

(22) Filed: Sep. 6, 2012

(65) Prior Publication Data
US 2014/0068326 A1 Mar. 6, 2014

(51) Int. Cl.
G06F 11/00 (2006.01)
G06F 11/07 (2006.01)

(52) U.S. Cl.
CPC ........ G06F 11/0709 (2013.01); G06F 11/0751 (2013.01)
USPC ........................................................ 714/4.2

(58) Field of Classification Search
CPC .............. G06F 11/0748; G06F 11/079; G06F 11/0793; G06F 11/3006; G06F 11/3051; G06F 11/3055
See application file for complete search history.

(56) References Cited

U.S. PATENT DOCUMENTS

| | | | |
|---|---|---|---|
| 7,076,696 B1 * | 7/2006 | Stringer | 714/47.3 |
| 7,593,936 B2 | 9/2009 | Hooks | |
| 7,908,271 B2 * | 3/2011 | Hooks | 707/728 |
| 8,104,087 B2 | 1/2012 | Quinn et al. | |
| 8,707,427 B2 * | 4/2014 | Hooks et al. | 726/22 |
| 2005/0120239 A1 | 6/2005 | Monroe et al. | |
| 2008/0109730 A1 | 5/2008 | Coffman et al. | |
| 2010/0005339 A1 * | 1/2010 | Hooks | 714/25 |
| 2010/0017879 A1 | 1/2010 | Kuegler et al. | |
| 2010/0023810 A1 | 1/2010 | Stolfo et al. | |
| 2011/0047621 A1 | 2/2011 | Brando et al. | |
| 2011/0099633 A1 | 4/2011 | Aziz | |
| 2011/0185430 A1 | 7/2011 | Sallam | |
| 2011/0247071 A1 * | 10/2011 | Hooks et al. | 726/24 |
| 2012/0079596 A1 | 3/2012 | Thomas et al. | |
| 2012/0102359 A1 * | 4/2012 | Hooks | 714/26 |
| 2012/0137342 A1 * | 5/2012 | Hartrell et al. | 726/1 |
| 2013/0117232 A1 * | 5/2013 | Lee et al. | 707/639 |

OTHER PUBLICATIONS

Search Report in corresponding International Application No. PCT/US13/55912, dated Mar. 6, 2014.

* cited by examiner

*Primary Examiner* — Charles Ehne
(74) *Attorney, Agent, or Firm* — Edell, Shapiro and Finnan LLC

(57) ABSTRACT

Systems and methods are provided for detecting an anomaly in a computer that is part of a population of networked computers. Snapshots are received from a plurality of computers within the population of computers, where individual snapshots include a state of assets and runtime processes of a respective computer. An asset normalization model is generated from the snapshots and serves as a baseline model for detecting an anomaly in the state of assets and runtime processes of a respective computer. A snapshot from at least one of the computers is compared to the asset normalization model in order to determine whether an anomaly is present in a state of static assets and runtime processes of the at least one of the computers.

35 Claims, 3 Drawing Sheets

SYSTEMS AND METHODS FOR AUTOMATED MEMORY AND THREAD EXECUTION ANOMALY DETECTION IN A COMPUTER NETWORK

FIELD OF THE INVENTION

The present invention relates to systems and methods for automated computer support.

BACKGROUND OF THE INVENTION

Management of a computer network, even a relatively small one, can be a daunting task. A network manager or administrator is often responsible for ensuring that users' computers are operating properly in order to maximize productivity and minimize downtime. When a computer begins to function erratically, or ceases to function altogether, a user will often contact a system administrator for assistance. As explained in U.S. Pat. No. 7,593,936 ("the '936 patent"), there are significant labor costs associated with investigating, diagnosing, and resolving problems associated with individual computers on a computer network.

Further, as explained in U.S. Pat. No. 8,104,087 ("the '087 patent"), there may be any number of reasons why a given computer is not working properly, including missing or corrupted file(s) or registry key(s), "malware" (including viruses and the like), as well as user-error. Unfortunately, due to staff limitations, an information technology (IT) department of a typical organization often resorts to three common "brute force" methodologies, e.g., reinstalling backups, resetting applications and data to a baseline configuration, and/or re-imaging, wherein all software is re-installed, anew, on the computer instead of finding a root cause of a problem.

The foregoing "brute force" approaches to computer problem remediation, as those skilled in the art will appreciate, amount to blanket data replacement methodologies that are not responsive to fixing, e.g., a singular, specific problem on a given computer and, moreover, often result in many undesirable side effects for the computer user. For example, the user may experience loss of user customized settings, may have to work through a lengthy downtime period, or may wind up losing user data.

To resolve some of the aforementioned issues, a scanner may be employed to scan computer assets in order to detect configuration anomalies. However, one issue with a scanner is that it operates on a static scan scope, i.e., a static set of computer assets. If malware exists outside of the static scope, the malware may never be detected. Further, in some scanner implementations the scan scope is not encrypted and can be viewed by any user of the machine. Thus, someone with knowledge of the scan scope can design malware "around" the scan.

In light of the often critical importance of maintaining user data and avoiding unnecessary downtime, there is a need to provide a different approach to computer problem remediation.

SUMMARY OF THE INVENTION

Embodiments of the present invention provide systems and methods for detecting an anomaly in a computer that is part of a population of networked computers. In one embodiment, snapshots are received from a plurality of computers within the population of computers, where individual snapshots include a state of assets and runtime processes of a respective computer. An asset normalization model is generated from the snapshots and serves as a baseline model for detecting an anomaly in the state of assets and runtime processes of a respective computer. A snapshot from at least one of the computers is compared to the asset normalization model in order to determine whether an anomaly is present in a state of static assets and runtime processes of the at least one of the computers.

The '936 patent describes a system and method by which an anomaly on a given computer can be detected by using an "adaptive reference model" that may be used to establish "normal" patterns in data stored on a plurality of computers in a given network of computers. The '087 patent describes a system and method to automatically correct data anomalies that differ from the norm. Anomalies that are particularly suited to be repaired include, but are not limited to, a missing file, missing data, or a missing portion of a file or of data, a missing registry key, a corrupted file, or a corrupted registry key. Anomalies may also include unexpected files or data.

The present invention embodiments may leverage such a non-runtime or statically operated systems for anomaly detection as described in the '936 and '087 patents, but also include dynamic or run-time memory scanning techniques to detect anomalies, and may rely on any other methodology to perform static and dynamic scanning to identify an anomaly on a computer in a computer network. As referred to herein, the breadth of static analysis may be regarded as a "static scan scope," the breadth of dynamic analysis may be regarded as an "active scan scope," and collectively as a "scan scope."

Anomalies that are particularly suited to be repaired using the methodology of the present invention include, but are not limited to, executing software (processes and threads), dynamic-link libraries (DLLs), or processes that could or will run (e.g., autostart mechanisms, layered service provider (LSP) DLL, Input/Output (I/O) request packet (IRP) handlers, Microsoft's Windows' operating system service dispatch table (SSDT), etc.). Aspects of the present invention can likewise operate to remove or stop unexpectedly active processes.

The scanning of memory assets forms a basis of an entirely new class of anomalies, enabling invention embodiments described herein to detect software exploitation techniques in real time.

These and other features of embodiments of the present invention and their attendant advantages will be more fully appreciated upon a reading for the following detailed description in conjunction with the associated drawings.

DETAILED DESCRIPTION

Figure 1:
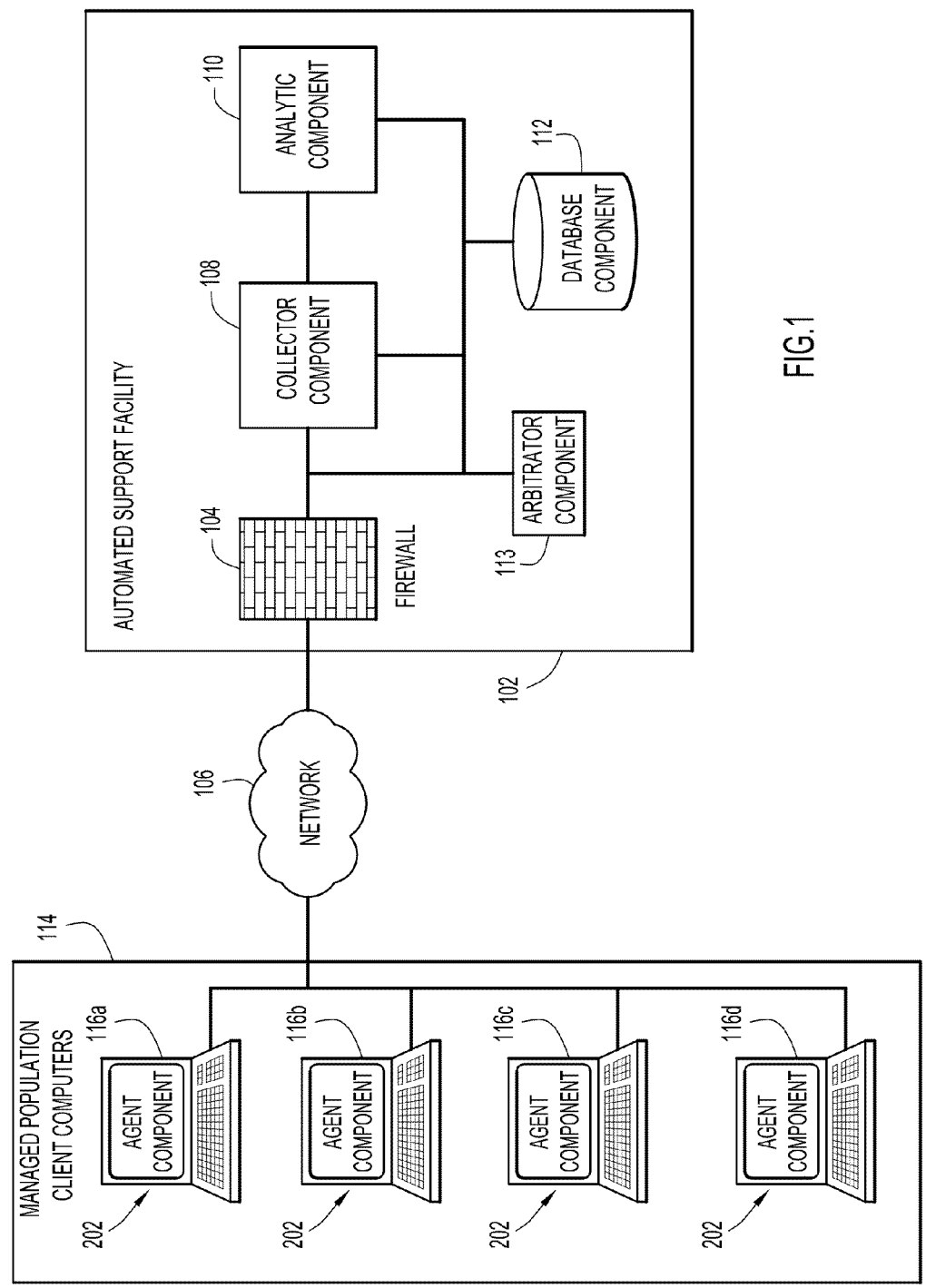
FIG. 1 illustrates an exemplary environment in which an embodiment of the present invention may operate.

Embodiments of the present invention provide systems and methods for automated computer support, remediation, and run-time monitoring. Referring now to the drawings in which like numerals indicate like elements throughout the several figures, FIG. 1 is a block diagram illustrating an exemplary environment in which an embodiment of the present invention may operate. This environment and configuration is described in detail in the '956 application, with added details described in the '087 patent, which are incorporated herein by reference in their entireties. Although the present invention is described in the context of the '956 and '087 patents, those skilled in the art will appreciate that aspects of the present invention can be used independently of the systems and methods described therein. On the other hand, the granularity of computer problem/anomaly detection that is made possible by the systems and methods described in the '956 application and the benefits of the problem remediation techniques described in the '087 patent may help to further leverage the benefits of the run-time memory monitoring techniques described in connection with embodiments of the present invention.

Referring again to FIG. 1, there is shown an automated support facility 102. Although the automated support facility 102 is shown as a single facility in FIG. 1, it may comprise multiple facilities or be incorporated into a site where a managed population of computers 114 or network of computers resides. The automated support facility 102 may include a firewall 104 that is in communication with a network 106 for providing security to data stored within the automated support facility 102. The automated support facility 102 may also include a Collector component 108. The Collector component 108 may provide, among other features, a mechanism for transferring data in and out of the automated support facility 102 using, e.g., a standard protocol such as file transfer protocol (FTP), hypertext transfer protocol (HTTP), or a proprietary protocol. The Collector component 108 may also provide processing logic necessary to download, decompress, and parse incoming data, including "snapshots" of such data.

The automated support facility 102 may also include an Analytic component 110 in communication with the Collector component 108 and/or directly with network 106, and thus also the managed population of computers 114. The Analytic component 110 may include hardware and software for creating and operating on an "adaptive reference model" as described in detail in the '956 application, and summarized herein for context.

Database component 112, which may be in communication with both Collector component 108 and Analytic component 110 may be used to store the adaptive reference model(s). The Analytic component 110 extracts adaptive reference models and snapshots from Database component 112, analyzes the snapshots in the context of the reference model, identifies and filters any anomalies, and transmits response agent(s) (FIG. 2) when appropriate, all of which will be explained in more detail below. The Analytic component 110 may also provide a user interface for the system.

FIG. 1 shows only one Collector component 108, one Analytic component 110, and one Database component 112. However, those skilled in the art will appreciate that other possible implementations may include many such components, networked together as appropriate.

As will be described in greater detail herein, embodiments of the present invention provide automated support and remediation to a managed population 114 that may comprise a plurality of client computers 116a-d. Those skilled in the art will appreciate that the four client computers 116a-d shown are illustrative only, and that embodiments of the present invention may operate in the context of computer networks having hundreds, thousands or even more of client computers. The managed population 114 provides data to the automated support facility 102 via the network 106 using respective Agent components 202.

More specifically, an Agent component 202 is deployed within each monitored computer 116a-d and gathers data from its respective computer. Agent component 202 performs a process to generate an analysis baseline that can be summarized in four steps: 1) Runtime Dependency Analysis: for each runtime process, the set containing all executable modules currently loaded in each process is generated, as well as all registry keys and files corresponding to process open handles. 2) Static Dependency Analysis: analyze files containing executable codefinds modules that would be loaded if the modules were to actually be executed. Static analysis involves examination of the executable file and the DLLs that the executable imports, and produces a set of all referenced executable modules. 3) Scan items for new Unique Identifiers: the contents of the process memory and the open handles are scanned for any embedded product IDs or unique identifiers such as globally unique identifiers (GUIDs) or universally unique identifiers (UUIDs). 4) Search for new items containing Unique Identifiers: the set of new unique identifiers are used to find any other related assets, such as files or registry keys not already in the scan scope containing these identifiers. This set of new items will be the input for further Static Dependency Analysis. The above four steps are repeated until no new items are added to the scan scope.

For example, during an active scan before or during runtime or upon thread launch, the set containing all executable modules currently loaded in each process, as well as all registry keys and files corresponding to handles open by the process are monitored and their corresponding parameters are recorded. Parameters such as the size of the code, code or file hash, code segments, and associated libraries and communication links or pathways, and memory address space, can be monitored for changes in size and/or behaviors.

Agent component 202, at scheduled intervals (e.g., once per day) or in response to a command from the Analytic component 110, takes a detailed "snapshot" of the state of the machine in which it resides. This snapshot may include a detailed examination of all system files, designated application files, the registry, performance counters, processes, services, communication ports, hardware configuration, and log files. The results of each scan, referred to as the "snapshot," are then (optionally) compressed and transmitted to Collector component 108 and/or database component 112.

Additionally, Agent component 202 is preferably configured to transmit, e.g., over network 106 and thus potentially to all computers 116a-d, requests for corrective data that can be used to replace corrupt data or that can be used to complete missing data on the computer in which the Agent component 202 resides, e.g., complete a portion of a missing file. In a preferred embodiment, a request for corrective data (also referred to herein as an "asset") is directed not to all computers, but instead to an Arbitrator component 113, which is shown as being interconnected within automated support facility 102, but may alternatively be implemented as another computer 116 that is in communication with network 106.

Each of the servers, computers, and network components shown in FIG. 1 comprise processors and computer-readable media. As is well known to those skilled in the art, an embodiment of the present invention may be configured in numerous ways by combining multiple functions into a single computer or alternatively, by utilizing multiple computers to perform a single task.

The processors utilized by embodiments of the present invention may include, for example, digital logic processors capable of processing input, executing algorithms, and generating output as necessary in support of processes according to the present invention. Such processors may include a microprocessor, an Application Specific Integrated Circuit (ASIC), and state machines. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C#, C++, Visual Basic, Java, and JavaScript.

Figure 2:
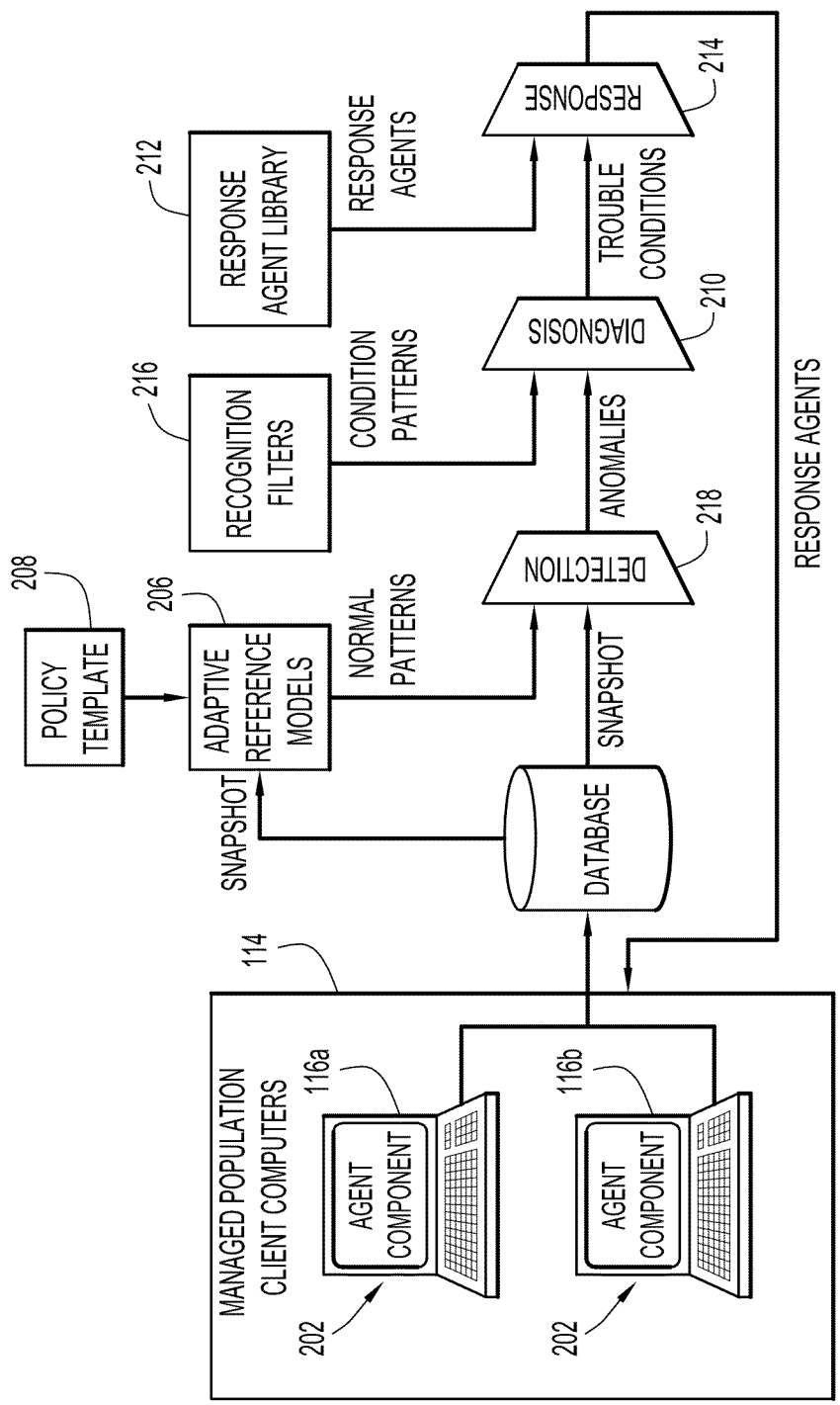
FIG. 2 is a block diagram illustrating a flow of information and actions in accordance with an embodiment of the present invention.

FIG. 2, reproduced from the '936 and '087 patents, provides additional context with respect to snapshot analysis. Those skilled in the art will appreciate that embodiments of the present invention do not necessarily need to implement the same sort of snapshot analysis described herein and in the '936 and '087 patents. On the other hand, the granularity of problem detection that is made possible by implementing such a snapshot analysis methodology may help to further leverage the benefits of the run-time analysis techniques described herein.

FIG. 2 is a block diagram illustrating a flow of information in connection with snapshot analysis. The embodiment shown comprises, as shown in FIG. 1, an Agent component 202, which may perform several functions. First, it may be responsible for gathering data by scanning the client machine 116 at scheduled intervals, in response to a command from the Analytic component 110, or in response to events of interest detected by the Agent component 202 itself. As mentioned, the scan may include a detailed examination of all system files, designated application files, the registry, performance counters, hardware configuration, logs, running tasks, services, network connections, and other relevant data. The results of each scan may, as already indicated, be compressed and transmitted over a network in the form of a snapshot to the Collector component 108 and/or associated database.

In one embodiment, the Agent component 202 reads every byte of files to be examined and creates a digital signature or hash for each file or item of software. The hash function may be, e.g., a secure hash such as the Secure Hash Algorithm (SHA). The digital signature identifies the exact contents of each file rather than simply providing metadata, such as the size and the creation date. This can be particularly helpful in that some conventional viruses can change the file header information of a given file in an attempt to fool systems that rely on metadata for virus detection. The digital signature methodology that may be implemented in connection with the present invention is thus still able to successfully detect such viruses.

The scan of the client computer 116 by the Agent component 202 may be resource intensive. Accordingly, in one embodiment, a full scan is performed periodically, e.g., daily, during a time when the user may not be using the client machine. In another embodiment, the Agent component 202 performs a delta-scan of the client machine, logging only the changes from the last scan. In still another embodiment, scans by the Agent component 202 are executed on demand, providing a valuable tool for a technician or support person attempting to remedy an anomaly or reported problem on the client machine.

A second major function performed by the Agent component 202 is that of behavior blocking. For example, the Agent component 202 may constantly (or substantially constantly) monitor access to key system resources such as system files and the registry and, where appropriate, selectively block access to these resources in real time to prevent damage from malicious software. While behavior monitoring may occur on an ongoing basis, behavior blocking may be enabled as part of a repair action. For example, if the Analytic component 110 suspects the presence of a virus, it can download a repair action to cause the client, via the Agent component 202, to block the virus from accessing key information resources within the managed system.

A third function performed by the Agent component 202 is to provide an execution environment for "response agents." Response agents may be commands that are understood by Agent component 202 or may be more comprehensive "mobile software components" that implement automated procedures to address various types of trouble conditions. For example, if the Analytic component 110 suspects the presence of a virus, it can download a response agent to cause the Agent component 202 to remove the suspicious code or data from the managed system. The Agent component 202 may run as a service or other background process on the computer being monitored. Because of the scope and granularity of information provided by embodiments of the present invention, repair can be performed more accurately than with conventional systems.

Still another function of the Agent component 202 is, in response to a received response agent (which may simply be a command or message, and not necessarily an independently executable function), to initiate a sequence of events beginning with an AssetRequest message to, e.g., Arbitrator component 113, that ultimately causes one or more Donor computers to deliver to the Asset requestor (also referred to herein as a "target computer" or "Recipient") specific data, e.g., corrective data, which is then stored within the recipient to replace, or add to, existing data on that computer and thereby remediate a problem or anomaly.

As further shown in FIG. 2, an embodiment of the present invention may include an adaptive reference model component 206, as explained in detail in the '956 patent. The adaptive reference model 206 is used to analyze snapshots from many computers and identify statistically significant patterns using a generic data mining algorithm or a proprietary data mining algorithm designed specifically for this purpose. Once a reference is established, one or more sample snapshots can be used to determine if anything abnormal is occurring within the entire population or any member of the population.

A Policy Template component 208 allows the service provider to manually insert rules in the form of "policies" into the adaptive reference model. Policies are combinations of attributes (files, registry keys, etc.) and values that when applied to a model, override a portion of the statistically generated information in the model. This mechanism can be used to automate a variety of common maintenance activities such as verifying compliance with security policies and checking to ensure that the appropriate software updates have been installed.

As part of the information flow of FIG. 2, there is further provided a Detection module 218 that is arranged to receive given ones of snapshots and to detect an anomaly in the snapshot as compared to "normal" patterns provided by a given adaptive reference model. An anomaly, as used herein, may be defined as an unexpectedly present asset, an unexpectedly absent asset, or an asset that has an unknown value. Anomalies may be matched against a library of Recognition Filters 216 via a Diagnosis module 210. A Recognition Filter 216 comprises a particular pattern of anomalies that indicates the presence of a particular root cause condition or a generic class of conditions.

Recognition Filters 216 may also associate conditions with a severity indication, a textual description, and a link to a response agent. In another embodiment, a Recognition Filter 216 can be used to identify and interpret benign anomalies. For example, if a user adds a new application that the administrator is confident will not cause any problems, the system according to the present invention will still report the new application as a set of anomalies. If the application is new, then reporting the assets that it adds as anomalies is correct. However, the administrator can use a Recognition Filter 216 to interpret the anomalies produced by adding the application as benign.

If an anomaly is matched to a known condition using a recognition filter, a root cause of a problem may then be known. With that information, namely a Trouble Condition, a Response module 214, in combination with a Response Agent Library 212, can be used to select an appropriate Response Agent to return to Agent component 202 resident on the computer that has been identified as having anomalous data. Further details regarding adaptive reference module development and use can be found in the '956 application. In sum, whether it is via use of an Adaptive Reference Model, or some other means, a necessary element of the present invention is the identification of a particular anomaly that may exist on a given (e.g., target) computer.

There are three main types of anomalies that are suitable for remediation in the context of the present invention. First, there may be an unexpectedly absent (UA) anomaly that occurs when it has been determined that a computer is missing data (e.g., an incomplete installation of a program, or a deleted file or registry key). Second, there may be an unknown value (UV) anomaly that occurs when it has been determined that particular data is different from what it should be (e.g., a file is corrupted, a registry key has been modified, a process has been injected, or call stack exploit). Remediation (in a highly automated fashion) of both of these types of anomalies is possible with embodiments of the present invention. A third type of anomaly, an unexpectedly present (UP) anomaly, occurs when the computer includes data that should not be there. Remediation of this type of anomaly involves deleting or removing the unexpected data.

Figure 3:
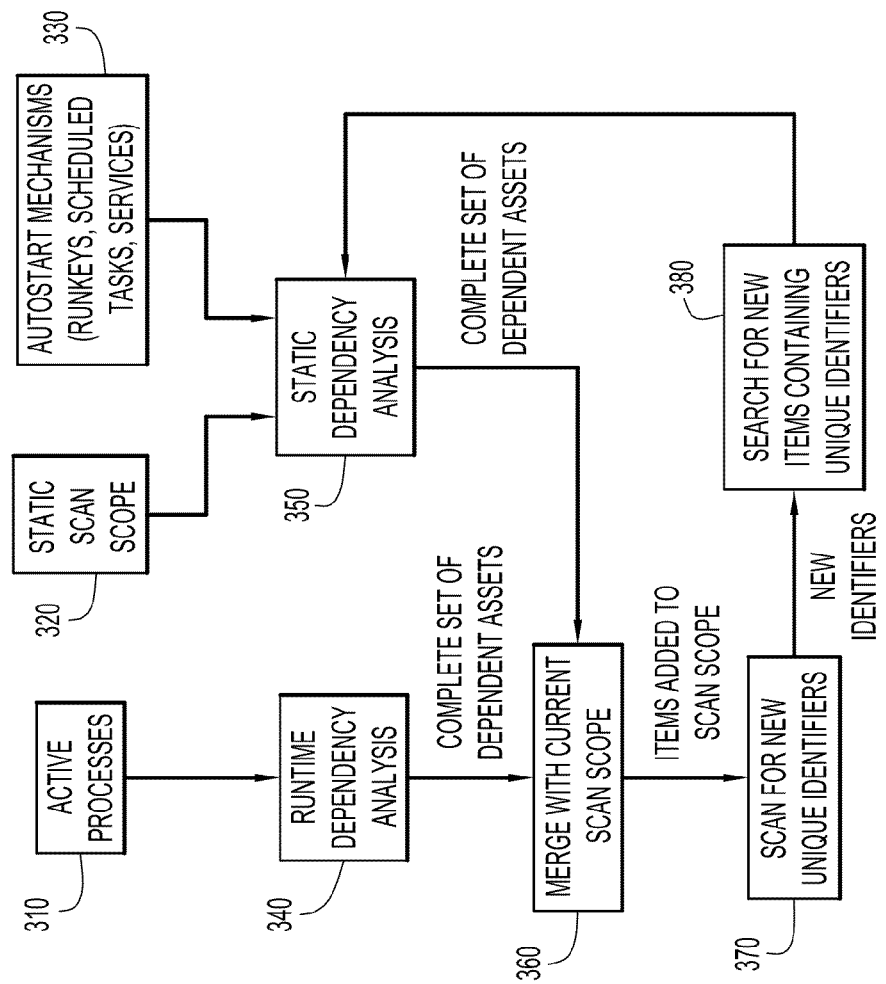
FIG. 3 is a flowchart illustrating a process for static and active computer scanning for anomaly detection in accordance with an embodiment of the present invention.

FIG. 3 is a flowchart illustrating a process for anomaly detection using static and active computer scanning. A static scan scope 320 is developed to identify the set of computer assets that are installed on a given computer or computers that forms a baseline or norm of computer assets that are properly configured (i.e., not corrupt or infected with malware or viruses). This baseline can be developed as described in the '936 and '087 patents. Autostart mechanisms 330 (e.g., runkeys, scheduled tasks, services, etc.) are compiled along with the static scan scope 320. Static dependency analysis is performed at 350 and a complete set of statically dependent assets is obtained.

Similarly, active processes 310 are catalogued. Their associated runtime dependencies 340 are analyzed to produce a complete set of dynamically dependent assets. The static and dynamic sets of assets are combined to produce an overall scan scope. Items generated at steps 310-350 may be reiterated periodically, or when changes in an asset changes or new assets are added to the overall scan scope. Once the scan scope is established, the assets are scanned for unique identifiers 370. Newly discovered IDs (e.g., GUIDs and UUIDs) are added to an ID scan list 380. Static files and runtime processes are searched for IDs in the ID scan list. Newly identified assets are added to the scan scope.

To facilitate the techniques described herein, scan scope, and runtime and static dependency techniques are described below. One technique is asset normalization. In order to be able to compare assets in memory, a unique identity is developed for in-memory assets, e.g., DLLs and other items associated with the memory of a process that is stable across different machines and different instances of the process on the same machine. To facilitate development of a unique asset identity, a transform is applied to the source code or normalized memory space. In one example, the memory contents of executable code segments may be hashed using a cryptographic hash, and the set of hashes for all of the memory regions can be used as the identity of the module. Accordingly, a process can be identified by the hash of all of its corresponding code segments. These normalized assets may be referred to as an asset normalization model. The asset normalization model may be separate or may be part of the adaptive reference model.

A next set of techniques comprises detecting behavioral anomalies. The relationship between memory assets can be considered an asset for the purposes of anomaly detection. A first example technique for detecting behavioral anomalies by a memory scanner that may be generated by malware is detecting DLL injection. The same application executing on many systems would have the same set of DLLs loaded into memory, and the set of executing code forms a unique identity of a process. If a correlation of process to its loaded DLLs is encoded as an asset, these assets would form a cluster of assets in the model, and a DLL injected by a virus or malware would produce an unexpectedly present anomaly within the model.

An example of detecting DLL injection is examined below by way of Windows Explorer (explorer.exe) that is a graphical user interface application for viewing files on a device, e.g., a personal computer (PC). Most machines in the computer population, e.g., a population of similar machines with similar operating systems, exhibit the same set of modules loaded in the explorer.exe process, as shown below:

```
Process Name:
    explorer.exe
    Loaded DLLs for explorer.exe:
        c:\windows\temp\actxprxy.dll
        c:\windows\system32\cscobj.dll
        c:\windows\system32\ cscui.dll
        c:\windows\system32\ davclnt.dll
        c:\windows\system32\ dhcpcsvc.dll
        c:\windows\temp\iertutil.dll
        c:\windows\winsxs\msimg32.dll
        c:\windows\winsxs\ntshrui.dll
        c:\windows\winsxs\Wldap32.dll
        c:\windows\winsxs\wscapi.dll
```

However, for example, on one machine there is malicious software that has injected itself into the currently running explorer.exe application. The explorer.exe application will have the previous set of loaded modules plus an additional DLL, e.g., c:\temp\webcheck.dll, as shown below and not found operating on other machines, e.g., PCs.

```
Process Name:
    explorer.exe
Loaded DLLs:
    c:\windows\temp\actxprxy.dll
    c:\windows\system32\cscobj.dll
    c:\windows\system32\ cscui.dll
    c:\windows\system32\ davclnt.dll
    c:\windows\system32\ dhcpcsvc.dll
    c:\windows\temp\iertutil.dll
    c:\windows\winsxs\msimg32.dll
    c:\windows\winsxs\ntshrui.dll
    c:\windows\winsxs\Wldap32.dll
    c:\windows\winsxs\wscapi.dll
    c:\temp\webcheck.dll
```

This additional DLL (c:\temp\webcheck.dll) would be identified as being an unexpectedly present anomaly for this process, thereby identifying the malicious software or other application that may have infiltrated an individual machine.

An example technique that a memory scanner can use for detecting behavioral anomalies that may be generated by malware is detecting initial exploitation that spawns anomalous threads by encoding an asset that represents the execution stack whenever a new thread is created in a process. Exploitation of a machine typically begins with some technique to gain its own thread of execution on that machine. Exploitation can come in many forms, such as a stack overflow (which is common), just-in-time (JIT) compilation spraying (e.g., by way of an Aurora Java Virtual machine (JVM)), or on a call return to libc attack. For all of these techniques, the first stage is to inject a small section of code into a process's memory and start a thread of execution in that process. If a model of the call stack has been defined and associated with thread creation, then use of these techniques would show up as an unexpectedly present thread creation technique.

Accordingly, a callback can be registered for any time a process creates a new thread of execution. This callback can capture a stack trace of the code execution path which triggered the creation of the thread. The set of stack traces and their associated processes can be used to build a statistical model characterizing thread creation behavior.

Thus, when a stack overflow exploit is attempted, the execution path that triggered the thread creation will contain code addresses at the top of the call stack which reference memory locations that cannot be connected to properly loaded executable code (i.e., they will point to stack memory locations instead of code locations). The rogue code memory locations may also contain code locations at the bottom of the stack trace, which could be connected to other loaded executable modules and that would not normally be associated with thread creation (according to the recorded model). This would trigger the generation of a real time thread creation anomaly.

In the case of return to libc attacks, while the execution path that triggers the thread creation would reference normally loaded executable modules, the offsets within these modules at the top of the call stack would not match any previous memory locations associated with thread creation, thereby generating a real time thread creation anomaly. In the most common JIT spraying attacks, the origin of the thread creation exists in dynamically allocated executable memory where the JIT compiler places compiled code fragments. This process would also show up as a real time thread creation anomaly on the basis that thread creation from such memory segments could not be traced back to a loaded module.

Tables 1 and 2 provide an example illustrating the difference between a normal stack trace (Table 1) that triggered thread creation and a thread creation that was triggered by a stack overflow exploit (Table 2). The return addresses in the stack frame are post processed in an attempt to resolve the addresses to offsets within functions that are contained in modules loaded by the process. In the case of the normal thread creation stack trace, we find that all of the addresses in the stack frame are traceable to known functions and modules already loaded by the process.

TABLE 1

Normal call stack

| Address | Offset | Function | Module |
|---|---|---|---|
| 0x0064f014 | 0x14 | NtCreateThread | kernel32.dll |
| 0x0043f230 | 0x3b0 | NlNetlogonMain | netlogon.dll |
| 0x0068d1d4 | 0x7af | LsalFreeReturnBuffer | lsasrv.dll |
| 0x0068d060 | 0x236 | LsalOpenPolicyTrusted | lsasrv.dll |
| 0x007f0320 | 0x18b | RegDisablePredefinedCache | advapi32.dll |
| 0x0064f014 | 0x12 | BaseThreadInitThunk | kerne32.dll |
| 0x008df928 | 0x4d | LdrInitializeThunk | ntdll.dll |

In the example shown in Table 2, a thread creation is triggered by a stack overflow exploit that takes advantage of a weakness in LsalFreeReturnBuffer (in connection with LsalOpenPolicyTrusted as shown in Table 1). The original return address of 0x0068d060 shown in Table 1 was replaced with the address of an injected code fragment at address 0x0264d88 which called a process known as NtCreateThread in order to spawn an "Unknown" process as shown in Table 2, below. Note that the address of the injected code fragment (0x0264d88) does not map to an offset within a loaded module. Accordingly, a behavioral signature is created that can be used to detect the exploit when or as it occurs.

TABLE 2

Call stack with anomaly

| Address | Offset | Function | Module |
|---|---|---|---|
| 0x0064f014 | 0x14 | NtCreateThread | kernel32.dll |
| 0x0264d88 | Unknown | Unknown | Unknown |
| 0x007f0320 | 0x18b | RegDisablePredefinedCache | advapi32.dll |
| 0x0064f014 | 0x12 | BaseThreadInitThunk | kerne32.dll |
| 0x008df928 | 0x4d | LdrInitializeThunk | ntdll.dll |

In order for the anomaly detection techniques mentioned above to be commercially viable, the number of false positive reports should be minimized. In other words, reporting an anomaly when one does not exist makes the process appear less than trustworthy to an end user. To affirm a positive anomaly detection event, the correlations between assets on a single machine as it changes over time are used to minimize the contribution of sporadic behavior to the model built over a large number of machines. Each machine periodically updates a model for each of its running processes. These models evolve over time, as processes start and stop, load and unload different modules, open and close files, and spawn threads.

At regular intervals, the agent 202 sends the portion of the updated model to the server, which includes the stable components of the process models and contains a behavior profile of all processes measured. The components of the process model which do not change frequently are then used to build a model encompassing similar stable process samples from a large number of machines. One example of items in a process model that change frequently may be the set of handles (Files and Registry Keys) open by an application, e.g., a word processing application. The handle data changes as the user works on different files over time, and tracking those specific files would not be useful in characterizing the generic behavior of the application. This set of handles can be excluded when the process models are sent to the server to be combined with similar process models from other computers.

Once the asset normalization model is stable, the model can be distributed to client machines and can be used offline. The server component can share the stable components of the model built using data from the entire population with each individual agent. This would enable real-time checking for anomalies against the model performed by the agent in a continuous manner when the agent is not able to communicate with a server, e.g., the server component of the automated support facility.

Furthermore, just as there are items in a machine that change frequently over time and contain little value when characterizing general behavior, there are items in a scan which may not frequently change, but are unique to a particular machine and contain similarly low value when characterizing general behavior. Examples of such items are the files of an application installed on only a single machine in the environment. Such items are not relevant to other machines in the environment, and therefore would not be distributed to the population to be used for real-time checks.

As those skilled in the art will appreciate from the foregoing disclosure, by implementing automated systems and methods for detecting an anomaly in a computer that is part of a population of networked computers within a managed network of computers, the systems and methods described herein may be embodied in other specific forms without departing from the spirit or essential characteristics thereof. The foregoing embodiments are therefore to be considered in all respects illustrative and not meant to be limiting.

What is claimed is:

1. A method for detecting an anomaly in a computer that is part of a population of networked computers, the method comprising:
   receiving snapshots from a plurality of computers within the population of computers, wherein individual snapshots include a state of assets and runtime processes of a respective computer;
   generating an asset normalization model from the snapshots that serves as a baseline model for detecting an anomaly in the state of assets and runtime processes of a respective computer, wherein detecting an anomaly comprises detecting a behavioral anomaly comprising one or more of changes in code, changes in execution stack and changes in thread execution; and
   comparing a snapshot from at least one of the computers to the asset normalization model to determine whether an anomaly is present in a state of static assets and runtime processes of the at least one of the computers.

2. The method of claim 1, further comprising deploying to the plurality of computers an agent that is configured for one or more of generating a snapshot, transmitting the snapshot, and detecting an anomaly using the asset normalization model.

3. The method of claim 1, wherein the snapshots comprise code segments that have been encoded using a transform function.

4. The method of claim 3, wherein the transform function includes a cryptographic hash.

5. The method of claim 1, wherein changes in code include changes in a code segment, code injection, and code removal.

6. The method of claim 1, wherein changes in the execution stack include improper code addresses inserted into the call stack.

7. The method of claim 1, wherein changes in thread execution include improper thread creation, improper thread execution, and improper thread destruction.

8. The method of claim 1, deriving a statistical model for normal process execution in order to detect changes in runtime process behavior that constitute a behavioral anomaly.

9. The method of claim 1, further comprising:
   searching the assets and runtime processes in order to find unique identifiers and related assets;
   adding found unique identifiers to a list of previously found unique identifiers and related assets;
   using the list to build a baseline of computer assets which contain these identifiers and related assets to scan during runtime operations in order to generate a snapshot; and
   periodically updating the list of unique identifiers as assets and runtime processes are added and removed from a respective computer.

10. The method of claim 1, further comprising, when an anomaly is detected:
    repairing the asset or runtime process associated with the anomaly by removing the asset, replacing the asset, or stopping the runtime process; and
    repairing any faults in the execution stack associated with the anomaly.

11. A system for detecting an anomaly in a computer that is part of a population of networked computers, comprising:
    a network interface configured to receive snapshots from a plurality of computers within the population of computers, wherein individual snapshots include a state of assets and runtime processes of a respective computer; and
    a processor configured to:
        generate an asset normalization model from the snapshots that serves as a baseline model for detecting an anomaly in the state of assets and runtime processes of a respective computer, wherein detecting an anomaly comprises detecting a behavioral anomaly comprising one or more of changes in code, changes in execution stack and changes in thread execution; and
        compare a snapshot from at least one of the computers to the asset normalization model to determine whether an anomaly is present in a state of static assets and runtime processes of at least one of the computers.

12. The system of claim 11, wherein the processor is further configured to deploy to the plurality of computers an agent that is configured for one or more of generating a snapshot, transmitting the snapshot, and detecting an anomaly using the asset normalization model.

13. The system of claim 11, wherein the network interface is configured to receive snapshots that comprise code segments that have been encoded using a transform function.

14. The system of claim 11, wherein changes in code include changes in a code segment, code injection, and code removal.

15. The system of claim 11, wherein changes in the execution stack include improper code addresses inserted into the call stack.

16. The system of claim 11, wherein changes in thread execution include improper thread creation, improper thread execution, and improper thread destruction.

17. The system of claim 11, wherein the processor is configured to derive a statistical model for normal process execution in order to detect changes in runtime process behavior that constitute a behavioral anomaly.

18. The system of claim 13, wherein the transform function includes a cryptographic hash.

19. The system of claim 11, wherein the processor is further configured to:
    search the assets and runtime processes in order to find unique identifiers and related assets;
    add found unique identifiers to a list of previously found unique identifiers and related assets;
    use the list to build a baseline of computer assets which contain these identifiers and related assets to scan during runtime operations in order to generate a snapshot; and
    periodically update the list of unique identifiers as assets and runtime processes are added and removed from a respective computer.

20. The system of claim 11, wherein when an anomaly is detected, the processor is further configured to:
    repair the asset or runtime process associated with the anomaly by removing the asset, replacing the asset, or stopping the runtime process; and
    repair any faults in the execution stack associated with the anomaly.

21. One or more computer readable storage media storing instructions for detecting an anomaly in a computer that is part of a population of networked computers, the instructions, when executed by a processor, cause the processor to:
    receive snapshots from a plurality of computers within the population of computers, wherein individual snapshots include a state of assets and runtime processes of a respective computer;
    generate an asset normalization model from the snapshots that serves as a baseline model for detecting an anomaly in the state of assets and runtime processes of a respective computer, wherein detecting an anomaly comprises detecting a behavioral anomaly comprising one or more of changes in code, changes in execution stack and changes in thread execution; and
    compare a snapshot from at least one of the computers to the asset normalization model to determine whether an anomaly is present in a state of static assets and runtime processes of the at least one of the computers.

22. The computer readable storage media of claim 21, further comprising instructions that are operable to deploy to the plurality of computers an agent that is configured for one or more of generating a snapshot, transmitting the snapshot, and detecting an anomaly using the asset normalization model.

23. The computer readable storage media of claim 21, wherein the instructions that are operable to receive comprise instructions that are operable to receive the snapshots that comprise code segments that have been encoded using a cryptographic hash.

24. The computer readable storage media of claim 21, wherein changes in code include changes in a code segment, code injection, and code removal.

25. The computer readable storage media of claim 21, wherein changes in the execution stack include improper code addresses inserted into the call stack.

26. The computer readable storage media of claim 21, wherein changes in thread execution include improper thread creation, improper thread execution, and improper thread destruction.

27. The computer readable storage media of claim 21, further comprising instructions that are operable to derive a statistical model for normal process execution in order to detect changes in runtime process behavior that constitute a behavioral anomaly.

28. The computer readable storage media of claim 21, further comprising instructions that are operable to:
    search the assets and runtime processes in order to find unique identifiers and related assets;
    add found unique identifiers to a list of previously found unique identifiers and related assets;
    use the list to build a baseline of computer assets which contain these identifiers and related assets to scan during runtime operations in order to generate a snapshot; and
    periodically update the list of unique identifiers as assets and runtime processes are added and removed from a respective computer.

29. The computer readable storage media of claim 21, wherein when an anomaly is detected, further comprising instructions that are operable to:
    repair the asset or runtime process associated with the anomaly by removing the asset, replacing the asset, or stopping the runtime process; and
    repair any faults in the execution stack associated with the anomaly.

30. A method for detecting an anomaly in a computer that is part of a population of networked computers, the method comprising:
    searching the assets and runtime processes in order to find unique identifiers and related assets;
    adding found unique identifiers to a list of previously found unique identifiers and related assets;
    using the list to build a baseline of computer assets which contain these identifiers and related assets to scan during runtime operations in order to generate a snapshot;
    periodically updating the list of unique identifiers as assets and runtime processes are added and removed from a respective computer;
    receiving snapshots from a plurality of computers within the population of computers, wherein individual snapshots include a state of assets and runtime processes of a respective computer;
    generating an asset normalization model from the snapshots that serves as a baseline model for detecting an anomaly in the state of assets and runtime processes of a respective computer; and
    comparing a snapshot from at least one of the computers to the asset normalization model to determine whether an anomaly is present in a state of static assets and runtime processes of the at least one of the computers.

31. The method of claim 30, further comprising, when an anomaly is detected:
    repairing the asset or runtime process associated with the anomaly by removing the asset, replacing the asset, or stopping the runtime process; and
    repairing any faults in the execution stack associated with the anomaly.

32. The method of claim 30, deriving a statistical model for normal process execution in order to detect changes in runtime process behavior that constitute a behavioral anomaly.

33. The method of claim 30, wherein the snapshots comprise code segments that have been encoded using a transform function.

34. A system for detecting an anomaly in a computer that is part of a population of networked computers, comprising:
    a network interface configured to receive snapshots from a plurality of computers within the population of computers, wherein individual snapshots include a state of assets and runtime processes of a respective computer; and a processor configured to:
search the assets and runtime processes in order to find unique identifiers and related assets;
add found unique identifiers to a list of previously found unique identifiers and related assets;
use the list to build a baseline of computer assets which contain these identifiers and related assets to scan during runtime operations in order to generate a snapshot;
periodically update the list of unique identifiers as assets and runtime processes are added and removed from a respective computer;
generate an asset normalization model from the snapshots that serves as a baseline model for detecting an anomaly in the state of assets and runtime processes of a respective computer; and
compare a snapshot from at least one of the computers to the asset normalization model to determine whether an anomaly is present in a state of static assets and runtime processes of at least one of the computers.

35. One or more computer readable storage media storing instructions for detecting an anomaly in a computer that is part of a population of networked computers, the instructions, when executed by a processor, cause the processor to:
search the assets and runtime processes in order to find unique identifiers and related assets;
add found unique identifiers to a list of previously found unique identifiers and related assets;
use the list to build a baseline of computer assets which contain these identifiers and related assets to scan during runtime operations in order to generate a snapshot; and
periodically update the list of unique identifiers as assets and runtime processes are added and removed from a respective computer;
receive snapshots from a plurality of computers within the population of computers, wherein individual snapshots include a state of assets and runtime processes of a respective computer;
generate an asset normalization model from the snapshots that serves as a baseline model for detecting an anomaly in the state of assets and runtime processes of a respective computer; and
compare a snapshot from at least one of the computers to the asset normalization model to determine whether an anomaly is present in a state of static assets and runtime processes of the at least one of the computers.

* * * * *